United States Patent [19]
Campbell

[11] Patent Number: 6,080,807
[45] Date of Patent: Jun. 27, 2000

[54] SOLVENT-FREE POLYESTER EMULSIONS

[75] Inventor: Les E. Campbell, Anderson, S.C.

[73] Assignee: Owens Corning Fiberglas Technology, Inc., Summit, Ill.

[21] Appl. No.: 09/190,470

[22] Filed: Nov. 12, 1998

[51] Int. Cl.[7] .................................................. C08K 5/13
[52] U.S. Cl. ...................... 524/377; 524/361; 524/376; 524/378
[58] Field of Search ................................. 524/376, 377, 524/378

[56] References Cited

U.S. PATENT DOCUMENTS

| | | | |
|---|---|---|---|
| 4,074,006 | 2/1978 | Boldebuck et al. | 428/379 |
| 4,210,571 | 7/1980 | Herman | 260/40 R |
| 4,616,062 | 10/1986 | Brannon et al. | 524/601 |
| 4,789,593 | 12/1988 | Das | 428/391 |
| 4,818,909 | 4/1989 | Balke | 310/208 |
| 4,912,157 | 3/1990 | Clark et al. | 524/265 |
| 4,927,869 | 5/1990 | Dana et al. | 523/502 |
| 4,981,754 | 1/1991 | Hsu | 428/288 |
| 5,356,989 | 10/1994 | Tachika et al. | 524/608 |
| 5,424,122 | 6/1995 | Crandall et al. | 428/355 |
| 5,436,312 | 7/1995 | Exner et al. | 528/176 |
| 5,541,251 | 7/1996 | Bontinck et al. | 524/507 |
| 5,554,675 | 9/1996 | Clark et al. | 524/376 |

FOREIGN PATENT DOCUMENTS 364331  6/1994  European Pat. Off. .

OTHER PUBLICATIONS

Varnish Product Data—"IMI 702 Solventless Polyester Varnish", PD–413A (Mar. 1990).
Varnish Product Data—"IMI 707 Solventless Polyester Resin", PD–424C (Jun. 1991).

*Primary Examiner*—Ana Woodward
*Attorney, Agent, or Firm*—Inger H. Eckert

[57] ABSTRACT

An aqueous emulsion of a substantially solvent free polyester comprising substantially solvent free polyester resin and ethylene oxide/propylene oxide surfactant, and method for making same.

6 Claims, No Drawings

SOLVENT-FREE POLYESTER EMULSIONS

TECHNICAL FIELD AND INDUSTRIAL APPLICABILITY OF THE INVENTION

The present invention relates to the manufacture of stable, solvent-free polyester emulsions. More particularly, the present invention relates to the formation of aqueous, solvent-free, polyester emulsions useful in a wide range of applications, including use as film forming agents in sizing compositions used in the manufacture of glass fibers for the reinforcement of polymeric articles.

BACKGROUND OF THE INVENTION

It is well known in the art to use glass fibers as reinforcements in the manufacture of polymeric composites. Typically, such fibers are manufactured by supplying glass in molten form to a bushing, drawing fibers from the bushing, and then gathering the fibers into a tow or strand. Usually, a sizing composition or chemical treatment is applied to the fibers after they are drawn from the bushing to protect the fibers from breakage during subsequent processing, and to improve the compatibility of the fibers with the matrix resins that are to be reinforced. Typically, the sizing compositions comprise one or more film-forming polymeric or resinous components, lubricants and glass-resin coupling agents dissolved or dispersed in water.

Polyester emulsions are well known and widely used as film formers in sizing compositions applied to glass fibers used in the reinforcement of polyester and vinylester materials, and are often used in the manufacture of continuous glass fiber reinforcement for filament winding and pultrusion operations. Typically the polyesters used in such sizing formulations are solids at room temperature, and are emulsified by first being dissolved in a suitable organic solvent such as styrene. However, the use of such solvent-containing emulsions in the sizing composition requires removal of the solvent after application of the sizing to the fibers, and increases the potential for release of volatile organic compounds (VOC's) into the work environment and atmosphere. In view of recent concerns over the effects of such VOC emissions, a need exists for a method for emulsifying such polyesters in water without the use of hydrocarbon solvents. Moreover, since the specific components of a particular sizing composition are usually carefully selected to provide optimum performance of the fibers in the intended reinforcement application, a need exists for a solvent-free method of emulsifying the polyesters used in present sizing compositions without deleteriously altering the chemical structure of the polyester. These needs are met by the process of the present invention described below.

SUMMARY OF THE INVENTION

The present invention provides a method for successfully formulating stable polyester emulsions without the use of hydrocarbon solvents. In particular, the present invention is directed to the preparation of substantially solvent-free polyester emulsions by a process that obviates the need to dissolve the polyester in a hydrocarbon solvent prior to emulsification.

According to the invention, such emulsions are obtained by heating the polyester resin to make it flowable; combining the polyester resin with a chemically compatible surfactant under low to moderate shear to form a substantially homogeneous mixture, while heating the mixture to a temperature where the viscosity of the resin/surfactant mixture is suitable for emulsification; and slowly adding water while allowing the temperature of the mixture to decrease. The resulting polyester emulsions have particle sizes of from about 200 to about 1000 nanometers, and are stable at room temperature.

DETAILED DESCRIPTION AND PREFERRED EMBODIMENTS OF THE INVENTION

The emulsification process of the present invention provides substantially solvent-free polyester emulsions that are stable at room temperature. As used herein, "substantially solvent-free" or "solvent-free" means that organic solvents are not used to dissolve the polyester resin for emulsification. However, it is understood that minor amounts of such solvents may be present in such resins as a consequence of their use in the process of forming the polyester resin.

According to the process of the invention, the solvent-free, polyester resin is heated to a temperature sufficient to lower its viscosity to that of a flowable liquid, typically to from about 55° C. to about 65° C., and is then charged into a mixing device with one or more surfactants that will interact with the resin molecules to make them dispersible in an aqueous liquid without altering their chemical structure. The resin and surfactants are mixed, preferably under low to moderate shear conditions, for a time sufficient to form a substantially homogeneous mixture, and heated to a temperature of from about 90° C. to about 100° C., more preferably from about 90° C. to about 95° C., to attain a viscosity suitable for the formation of an emulsion. Preferably the mixing device is capable of being heated to such a temperature so that the resin/surfactant mixture can be heated while being mixed. Alternatively, the resin can be heated to such temperatures prior to being combined with the surfactant, or the combination heated prior to introduction into the mixer. After the resin and surfactants are homogeneously mixed and sufficiently heated, heating of the mixer is terminated and water is added to the mixture. The water is preferably added to the mixture slowly, either continuously or incrementally, under high shear conditions. Useful water addition rates have been found to be from about 2.0 to about 5.0 percent of the weight of the resin every 8 to 15 minutes if added incrementally, or from about 0.2 to about 0.5 percent of the resin weight per minute if added continuously. As the water is added, the temperature of the resin-surfactant mixture is allowed to decrease. When the amount of water added to the mixer is about 30% of the weight of the resin, the temperature of the resin mixture is preferably about 70° C. to 75° C., the temperature where inversion typically begins to occur. If the temperature has not decreased to about such temperatures, it may be necessary to cool the mixture by artificial means. The water addition is carried out until a pourable viscosity is obtained, and the resulting emulsion is then allowed to cool to ambient room temperature.

The emulsification process of the invention is particularly well suited for the emulsification of unsaturated polyesters alkyd resins formed as the polycondensation reaction product of one or more polyhydric alcohols and one or more ethylenically unsaturated polycarboxylic acid compounds. As used herein, "polycarboxylic acid compounds" include the acids and their corresponding anhydrides, halides, and esters. Suitable unsaturated polycarboxylic acid compounds that contain polymerizable carbon-to-carbon double bonds include maleic, fumaric, aconitic, itaconic, mesaconic and citraconic acids, and the corresponding anhydrides, halides and esters. The dicarboxylic components are generally preferred, with fumaric acid and maleic anhydride being the most preferred.

A minor proportion of the unsaturated acids, anhydrides, acid halides and esters, up to about forty mole percent, usually may be replaced by dicarboxylic or polycarboxylic acids, anhydrides, acid halides and esters that do not contain a polymerizable carbon-to-carbon double bond. Suitable saturated acids include ophthalic, isophthalic, terephthalic, succinic, adipic, sebacic, oxalic, malonic, glutaric, methyl-succinic, and the like.

Typical polyhydric alcohols used to prepare the unsaturated polyester are those alcohols having two hydroxy groups, although minor amounts of alcohols having more or less hydroxy groups may be used. Dihydric alcohols that are useful in preparing the polyesters include 1,2-propane diol (hereinafter referred to as propylene glycol), dipropylene glycol, diethylene glycol, 1,3-butanediol, ethylene glycol, glycerol, 2-methyl-1,3-propanediol and the like. Mixtures of the foregoing alcohols may also be used.

Examples of suitable unsaturated polyesters include the polycondensation products of (1) propylene glycol and maleic and/or fumaric acids; (2) 1,3-butanediol and maleic and/or fumaric acids; and (3) combinations of ethylene and propylene glycols (approximately 50 mole percent or less of ethylene glycol) and maleic and/or fumaric acid. These examples are intended to be illustrative of suitable polyesters and are not intended to be all-inclusive. The unsaturated polyester is generally prepared by heating a mixture of the polyhydric alcohol and the polycarboxylic component in their proper molar ratios at elevated temperatures, usually between about 100° C. and 250° C. for extended periods of time, generally ranging from 5 to 15 hours.

The molecular weight of the unsaturated polyester resin may vary over a considerable range, but ordinarily those polyesters useful in the practice of the present invention have a molecular weight ranging from about 2,500 to about 15,000, and more preferably, from about 3,500 to about 8,500.

Preferred polyester alkyd resins that can be emulsified by the process according to the invention include dicyclopentadiene (DCPD) type polyester resins, such as those commercially available from Alpha Owens Corning under the trade designations EA830 and EA812; and adipate-type polyester resins such as E-4300 available from Alpha Owens Corning. A particularly preferred class of polyester alkyd resins emulsifiable by the present process is orthophthalic-type polyester resins such as E-400 commercially available from Alpha Owens Corning.

The surfactants that can be used in the process must generally satisfy several criteria. First, the surfactant must be capable of interacting with the unsaturated polyester resin molecules to enable their dispersion in an aqueous media at the temperatures encountered during the emulsification process, and maintain such dispersion at room temperatures. Second, the surfactants must be stable at the temperatures reached in the mixer during the emulsification process. Third, the surfactants must have cloud points sufficient to remain stable in the oil phase. Further, for polyester emulsions used in glass fiber sizing compositions, the surfactants preferably have a vaporization point below the temperatures encountered in the drying/curing of the sizing on the fiber such that the surfactants become volatile and are removed from the sizing composition that remains on the fibers.

To meet these criteria, the surfactants used in the present invention preferably are ethylene oxide/propylene oxide surfactants having HLB values of about 24 or greater, and molecular weights of from about 12,000 to about 20,000. A particularly preferred example of which is an ethylene oxide-propylene oxide surfactant having and HLB value of 24 and a molecular weight of 15,000 that is commercially available from BASF under the trade designation Pluronic® F108. The surfactants should be used in an amount sufficient to obtain the desired emulsion. Typically, surfactant loadings of from about 8% to about 20% of the polyester resin are sufficient.

Any mixing device capable of generating sufficient shear to form an emulsion can be used in the process of the invention. Preferred mixing devices are variable shear mixers that have a heated or heatable mixing chamber. An example of a suitable mixer is a Meyers mixer equipped with two or more shear blades and a sweep blade that wipes down the sides and bottom of the mixing chamber.

The polyester emulsions prepared by the process of the invention preferably have particle sizes of from about 300 to about 700 nanometers for increased stability.

EXAMPLES

The present invention is further illustrated by the following Examples, wherein all parts and percentages are on a weight basis unless otherwise indicated. As can be seen from these examples, many factors, including the molecular weight and HLB value of the surfactant selected, the amount of surfactant added, and the shear imparted to the mixture affect the properties (e.g., particle size) of the emulsions for a particular polyester resin. As used in the Examples, the designations which follow represent ethylene oxide/propylene oxide surfactants commercially available from BASF under the "Pluronic" ® or "Tetronic" ® trade designations, and TRL2129 and Synperonic OP10 commercially available from ICI.

| Product Designation | Average Molecular Weight | HLB Valve | Cloud Point ° C. | Melting Point ° C. |
|---|---|---|---|---|
| Pluronic ® L101 | 3800 | 1–7 | 15 | −23 |
| Pluronic ® F38 | 4700 | >24 | >100 | 48 |
| Pluronic ® P105 | 6500 | 12–18 | 91 | 35 |
| Pluronic ® F77 | 6600 | >24 | >100 | 48 |
| Pluronic ® F68 | 8400 | >24 | >100 | 52 |
| Pluronic ® F108 | 14,600 | >24 | >100 | 57 |
| Pluronic ® F127 | 12,600 | 18–23 | >100 | 56 |
| Tetronic ® 908 | 25,000 | >24 | >100 | 58 |
| Tetronic ® 1307 | 18,000 | 18–23 | >100 | 54 |
| TRL2129 | 8300 | 29 | >100 | 52 |
| Synperonic OP10 |  | 13 | >100 |  |

EXAMPLE 1

To a single 2" air-driven Cowle's blade mixer positioned over a hot plate was added 400 grams of a polypropylene maleate polyester resin, obtained from Alpha Owens Corning under the trade designation VII-117 polyester resin, preheated to a temperature of 110° C., followed by 37 grams of Pluronic P105 surfactant. After about 5 minutes of mixing at 1,500 RPM, the surfactant was thoroughly melted and mixed throughout the resin. The mixture temperature was maintained at 70–80° C. to reduce the viscosity. Thereafter, heating was discontinued and addition of room temperature water initiated under high shear mixing conditions of 2500 RPM. Water was added at a rate of 5% of resin per minute. Although some inversion appeared to occur at about 55° C., the composition failed to form a suitable emulsion.

EXAMPLE 2

The process set forth in Example 1 was repeated using 40 grams of Synperonic OP10 as the surfactant. No emulsion was formed.

EXAMPLE 3

To a single 2" air-driven Cowle's blade mixer was added 400 grams of VII-117 polyester resin preheated to 110° C. and 48 grams of Pluronic F108 surfactant. The mixer was operated at 1500 RPM for about 5 minutes to melt the surfactant and disperse it throughout the resin. During this time, the temperature of the mixture fell to about 75–80° C. After the resin and surfactant were thoroughly mixed, water at a temperature of from 60–70° C. was added at a rate of 5% of resin per 2 minutes, and the speed of the mixer was increased to 2500 RPM. A thick inversion was observed at about 60° C. at a total water addition of about 27% based on the weight of the resin.

EXAMPLE 4

To a single 2" diameter air-driven Cowle's blade mixer was added 400 grams of V11-117 polyester resin preheated to 110° C. and 48 grams of Pluronic F77 surfactant. The components were mixed at 1500 RPM for 5 minutes to disperse all the surfactant throughout the resin. The temperature was allowed to drift downward to 75–80° C. After the surfactant and resin blending was complete, room temperature (25° C.) water additions were made at the rate of 5% of resin weight per two minutes at high agitation of 2500 RPM. The inversion occurred at approximately 23% water addition and 60° C.

EXAMPLE 5

The procedures of Example 3 were repeated using a mixture of 24 grams of Pluronic F108 and 24 grams of Pluronic P105 as co-surfactants (50:50), and the resin was preheated to 110° C. The mixture temperature after blending was about 75° C. Water was added at a rate of 20 grams per two minutes at 2500 RPM agitation, and partial inversion occurred at approximately 60° C. at a total water addition of 35% of the polyester weight.

EXAMPLE 6

The procedures of Example 3 were repeated using 36 grams of Pluronic F108 and 12 grams of Pluronic P105, as co-surfactants (75:25). The co-surfactants were added to preheated 110° C. polyester resin VII-117 and blended at 1500 RPM for 5 minutes. The mixture temperature after blending was 90° C. Room temperature water was added at a rate of 20 grams per two minutes at 2500 RPM. Successful inversion of the resin into emulsion occurred at approximately 65° C. at a total water addition of about 32% of the weight of the polyester resin, resulting in a particle size of 795 nanometers.

EXAMPLE 7

To 400 grams of E400 polyester resin obtained from Alpha Owens Corning, preheated in a metal container to 110° C., was added 48 grams of Pluronic F108. The mixture was then blended together with a 2" air-driven Cowle's mixer at 1500 RPM for 5 minutes while maintaining heat with a hot plate. Thereafter, the hot plate was removed to allow the temperature to drift below 100° C. before beginning water additions. When the temperature of the mixture reached approximately 90° C., room temperature water additions were begun at very high agitation of 2500 RPM. The water was added at a rate of 20 grams per 2–3 minutes. Inversion began at approximately 22–25% water addition per polyester resin weight, and the temperature was in the range of 50–60° C. The polyester alkyd was successfully inverted into an emulsion with an average particle size of 552 nanometers.

EXAMPLE 8

The procedures of Example 6 were repeated using a mixture of 48 grams of Pluronic F68 and 400 grams of preheated E-400 polyester resin. The experiment produced a partial inversion of the alkyd resin to an emulsion having an average particle size of 1300 nanometers.

EXAMPLE 9

The procedures of Example 6 were repeated using a mixture of 48 grams of Pluronic F38 and 400 grams of preheated E-400 polyester resin. The surfactant failed to invert the polyester alkyd into an emulsion.

EXAMPLE 10

The procedures of Example 6 were repeated using a mixture of 48 grams of Pluronic F77 and 400 grams of preheated E-400 polyester resin. This experiment failed to invert the polyester alkyd.

EXAMPLE 11

The procedures in Example 6 were repeated using a mixture of 48 grams of TRL2129 surfactant and 400 grams of preheated E-400 polyester resin. This experiment produced a partial inversion of the polyester alkyd into an emulsion having an average particle size of 1000 nanometers.

EXAMPLE 12

To a single 2" air-driven Cowle's blade mixer was added 400 grams of [E-400] resin preheated to 135° C. Thereafter, 60 grams of F108 was added and mixed with the resin at 500 RPM. The F108 was thoroughly mixed into the resin within 1–2 minutes. Thereafter 160 ml of water at a temperature of about 40–45° C. was added slowly over a period of about 15 minutes. The mixer speed was then increased to 2000–2400 RPM. The mixture thickened, near inversion, after approximately 160 ml of water had been added and the mixer speed was increased to 2400 RPM. Resin was mixed for a total of approximately 25 minutes, and approximately 350 ml of water was added to form the emulsion. The average particle size of the emulsion was 725 nanometers.

EXAMPLE 13

The procedure of Example 12 was repeated to confirm the results. A similar particle size of 794 nanometers was obtained.

The properties of the emulsions formed in Examples 1–13 are summarized below in Table 1.

TABLE 1

| Example | Resin | Surfactant | Amount of Resin | Amount of Surfactant | Emulsion Particle Size nm |
|---|---|---|---|---|---|
| 1 |  | P105 | 400 | 37 | — |
| 2 | VII-117 | OP10 | 400 | 40 | — |
| 3 | VII-117 | F108 | 400 | 48 | 492 |
| 4 | VII-117 | F77 | 400 | 48 | 1600 |
| 5 | VII-117 | F108/P105 (50/50) | 400 | 48 | 1925 |

TABLE 1-continued

| Example | Resin | Surfactant | Amount of Resin | Amount of Surfactant | Emulsion Particle Size nm |
|---|---|---|---|---|---|
| 6 | VII-117 | F108/P105 (75/25) | 400 | 48 | 795 |
| 7 | E-400 | F108 | 400 | 48 | 552 |
| 8 | E-400 | F68 | 400 | 48 | 1300 |
| 9 | E-400 | F38 | 400 | 48 | — |
| 10 | E-400 | F77 | 400 | 48 | — |
| 11 | E-400 | TRL2129 | 400 | 48 | 1000 |
| 12 | E-400 | F108 | 400 | 60 | 725 |
| 13 | E-400 | F108 | 400 | 60 | 794 |

EXAMPLE 14

A Mini-Myers Mixer equipped with a sweep blade and a shaft with two shear blades was preheated to 100° C. with steam. To the preheated mixer, 11,187 grams of V11-117 polyester resin, preheated to 110° C., was added. Thereafter, 1,340 grams (12%) of Pluronic F108 surfactant was added to the resin and blended therewith for 20 minutes at 80° C. Upon completion of mixing, sweep blade speed was increased to 150 rpm and shear blades to 1500 rpm. Room temperature water was added at a rate of 300 grams every 10 minutes. During the water additions, the jacket mixer was intermittently cooled with chilled water to decrease mix temperature. After about 2,800 grams of water had been added, inversion occurred at a temperature of about 60° C. A successful emulsion was made with an average particle size of 595 nanometers, 63.7% solids at 17,880 cps viscosity.

EXAMPLE 15

The procedure of Example 14 was repeated with 1,008 grams (9.0%) Pluronic F108 surfactant added to 11,200 grams of V11-117 polyester resin preheated to 105° C., and the mixture introduced into a Mini-Myer's mixer preheated to 950° C. with steam. An emulsion having an average particle size of 1000 nanometers was obtained.

EXAMPLE 16

The procedure of Example 14 was repeated with a change in the sweep and shear speeds of 2×. The sweep speed was increased from 150 RPM to 300 RPM and the shear blade speed increased from 1500 to 2900 RPM. The resulting emulsion had an average particle size of 440 nanometers.

EXAMPLE 17

The procedure of Example 16 was repeated with 1,352 grams (15%) Pluronic F108 and 9.017 grams of V11-117 polyester resin. The resultant particle size was 328 nanometers.

EXAMPLE 18

The procedure of Example 14 was repeated with 12% Pluronic F77 surfactant. The experiment failed to invert the resin into an emulsion.

EXAMPLE 19

To a Mini-Meyer's Mixer preheated with steam to 90–950° C. was added 12,109 grams of E-400 polyester resin preheated to 115° C. To this was added 1816 grams of Pluronic F108 surfactant, and the sweep and shear blades were engaged to dissolve and mix the surfactant into the resin. The resin and surfactant were blended for about 15 minutes. Thereafter, steam heating of the mixer was terminated, and cold water was added to the mixer in 300 gram increments every 10 minutes following an initial charge of 600 grams of water. Inversion occurred when the temperature of the mixture had decreased to about 80° C., after the addition of about 4200 grams of water.

EXAMPLE 20

The procedure of Example 19 was repeated with 1,385 grams of TRL2129 surfactant blended in 11,543 grams of E-400 polyester resin. After 9 separate 300 gram water additions, some thickening near the inversion point occurred. However, final particle size of 2127 nanometers indicates that the surfactant didn't invert the alkyd into a complete emulsion.

EXAMPLE 21

The procedure of Example 19 was repeated with 15% Pluronic F68 mixed into E-400 polyester resin. A partial inversion occurred with an average particle size of 1,600 nanometers.

EXAMPLE 22

The procedure of Example 19 was repeated with 837 grams each of Pluronic F108 and Pluronic L101(50/50) which was 15% total surfactant of the E-400 polyester resin. The co-surfactants resulted in a partial inversion of the alkyd into emulsion, and a particle size of 2,530 nanometers was measured.

EXAMPLE 23

The procedure of Example 19 was repeated with 1,571 grams of Pluronic F77 (15%) mixed into 10,477 grams of E-400 polyester resin. This experiment resulted in a particle size of 2,175 nanometers indicating a partial inversion.

EXAMPLE 24

The procedure of Example 19 was repeated with 1,154 grams of Tetronic 908 (15%) in 7,693 grams of E-400 polyester resin. A partial inversion resulted in an emulsion having an average particle size of 1,126 nanometers.

EXAMPLE 25

The procedure of Example 19 was repeated with 15% Tetronic 1307 mixed into E-400 polyester resin. A partial inversion resulted in an average particle size of 1,246 nanometers.

EXAMPLE 26

The procedure of Example 19 was repeated with 1,026 grams of Pluronic F127 (12%) in 8,554 grams of V11-117 polyester resin. A partial inversion resulted in a particle size of 1,020 nanometers.

EXAMPLE 27

The procedure of Example 19 was repeated with 968 grams of Pluronic F108 (12%) mixed into 8,072 grams of V11-117 polyester resin. This experiment resulted in an emulsion with a particle size of 726 nanometers.

EXAMPLE 28

The procedure of Example 19 was repeated with 1,536 grams of Pluronic F108 (15%) mixed into 10,240 grams of V11-117 polyester resin. A quick inversion occurred after at 12 separate 300 gram water additions. The viscosity at inversion was very high. The emulsion had a particle size of 359 nanometers and exhibited good stability.

EXAMPLE 29

The procedure of Example 19 was repeated with 1,233 grams of Pluronic F108 (12%) mixed into 10,270 grams of heated V11-117 polyester resin. The resultant particle size was 808 nanometers.

EXAMPLE 30

The procedure of Example 19 was repeated with 1,608 grams of Pluronic F127 (15%) mixed into 10,720 grams of heated V11-117 polyester resin. This experiment produced a good emulsion with an average particle size of 472 nanometers.

The results of the experiments in Examples 14-30 are summarized below in Table 2.

TABLE 2

| Example | Resin | Surfactant | Amount of Resin (grams) | Amount of Surfactant (grams) | Emulsion Particle Size nm |
|---|---|---|---|---|---|
| 14 | VII-117 | F108 | 11,187 | 1,340 | 595 |
| 15 | VII-117 | F108 | 11,200 | 1,008 | 1000 |
| 16 | VII-117 | F108 | 11,187 | 1,340 | 440 |
| 17 | VII-117 | F108 | 9,017 | 1,352 | 328 |
| 18 | VII-117 | F77 | — | — | — |
| 19 | E-400 | F108 | 12,109 | 1,816 | 414 |
| 20 | E-400 | TRL2129 | 11,543 | 1,385 | 2,127 |
| 21 | E-400 | F68 | — | — | 1,600 |
| 22 | E-400 | F108/L101 50/50 | 11,163 | 1,674 | 2,530 |
| 23 | E-400 | F77 | 10,477 | 1,571 | 2,175 |
| 24 | E-400 | Tetronic 908 | 7,693 | 1,154 | 1,126 |
| 25 | E-400 | Tetronic 1307 | — | — | 1,246 |
| 26 | VII-117 | F127 | 8,554 | 1,026 | 1,020 |
| 27 | VII-117 | F108 | 8,072 | 968 | 726 |
| 28 | VII-117 | F108 | 10,240 | 1,536 | 359 |
| 29 | VII-117 | F108 | 10,270 | 1,233 | 808 |
| 30 | VII-117 | F127 | 10,720 | 1,608 | 472 |

The foregoing examples are provided for purpose of illustration only, and are in no way meant to limit the scope of the invention defined by the claims which follow.

What is claimed is:

1. A substantially solvent free polyester emulsion comprising:
    (a) a substantially solvent free polyester resin;
    (b) from about 8% to about 20% by weight, based on the weight of the polyester resin, of an ethylene oxide-propylene oxide surfactant; and
    (c) water.

2. The substantially solvent free polyester emulsion of claim 1, wherein said ethylene oxide-propylene oxide surfactant has an HLB value of about 24 or greater.

3. The substantially solvent free polyester emulsion of claim 2, wherein said ethylene oxide-propylene oxide surfactant has a molecular weight in the range of from about 12,000 to about 24,000.

4. The substantially solvent free polyester emulsion of claim 1, wherein said polyester has a molecular weight in the range of from about 2500 to about 15,000.

5. The substantially solvent free polyester emulsion of claim 4, wherein said polyester has a molecular weight in the range of from about 3500 to about 8500.

6. The substantially solvent free polyester emulsion of claim 1 made by a process comprising:
    (a) heating a solvent-free polyester resin to a temperature that provides a pourable viscosity;
    (b) combining said polyester with an ethylene oxide-propylene oxide surfactant;
    (c) blending said polyester resin and surfactant to form a substantial homogeneous mixture;
    (d) heating said mixture to a temperature in the range of from about 90° C. to about 100° C.; and
    (e) adding water at a temperature below that of said mixture to lower the temperature of said mixture, while mixing said mixture under sufficiently high shear conditions to form a substantially solvent-free polyester emulsion.

* * * * *